(12) United States Patent
Yu et al.

(10) Patent No.: US 8,504,033 B2
(45) Date of Patent: Aug. 6, 2013

(54) EMERGENCY MESSAGE TRANSMISSION METHOD AND ELECTRONIC DEVICE IMPLEMENTING THE METHOD

(75) Inventors: Ying-Chuan Yu, Tu-Cheng (TW); Ying-Xiong Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/077,959

(22) Filed: Mar. 31, 2011

(65) Prior Publication Data

US 2012/0122419 A1     May 17, 2012

(30) Foreign Application Priority Data

Nov. 16, 2010   (TW) .................................. 99139290

(51) Int. Cl.
*H05K 11/02* (2006.01)

(52) U.S. Cl.
USPC ...................................................... 455/435.1

(58) Field of Classification Search
USPC ............. 455/456.5, 404.1, 404.2, 414.1, 567, 455/456.1; 709/206, 219
See application file for complete search history.

(56) References Cited

U.S. PATENT DOCUMENTS

| 2008/0261626 A1* | 10/2008 | Farazmandnia | ........... 455/456.5 |
| 2010/0003948 A1* | 1/2010 | Ray et al. | ................... 455/404.1 |
| 2010/0003958 A1* | 1/2010 | Ray et al. | ................... 455/404.2 |
| 2010/0161224 A1* | 6/2010 | Lee et al. | ...................... 701/300 |

FOREIGN PATENT DOCUMENTS

| CN | 101242609 | 8/2008 |
| TW | I234986 | 6/2005 |
| TW | M381138 | 5/2010 |

* cited by examiner

*Primary Examiner* — Kiet Doan
(74) *Attorney, Agent, or Firm* — Altis Law Group, Inc.

(57) ABSTRACT

In a method for transmitting an emergency message by an electronic device, a start signal is generated at the time of a trigger operation by a detection unit, location information of the electronic device is periodically acquired and transmitted to a memory by a location acquisition unit; location at the time of the trigger operation or that at the most recent time point is acquired from the memory, an emergency message is generated based on the acquired location information and transmitted to one or more pre-determined target addresses by a transmission unit. An electronic device for transmitting the emergency message is also provided.

4 Claims, 3 Drawing Sheets

EMERGENCY MESSAGE TRANSMISSION METHOD AND ELECTRONIC DEVICE IMPLEMENTING THE METHOD

BACKGROUND

1. Technical Field

The present disclosure relates to electronic devices and, particularly, to an emergency message transmission method and an electronic device implementing the method.

2. Description of Related Art

With the development of wireless communication technology, mobile terminals are frequently used to transmit emergency messages.

Currently, a user can directly call an emergency services provider using a mobile terminal and explain the situation. Alternatively, the user can send a short message using the mobile terminal doing the same. However, if the user is unable to relate the location clearly, services can be delayed.

Therefore, it is necessary to provide an electronic device and control method capable of overcoming the limitations described.

BRIEF DESCRIPTION OF THE DRAWINGS

Many aspects of the present disclosure should be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
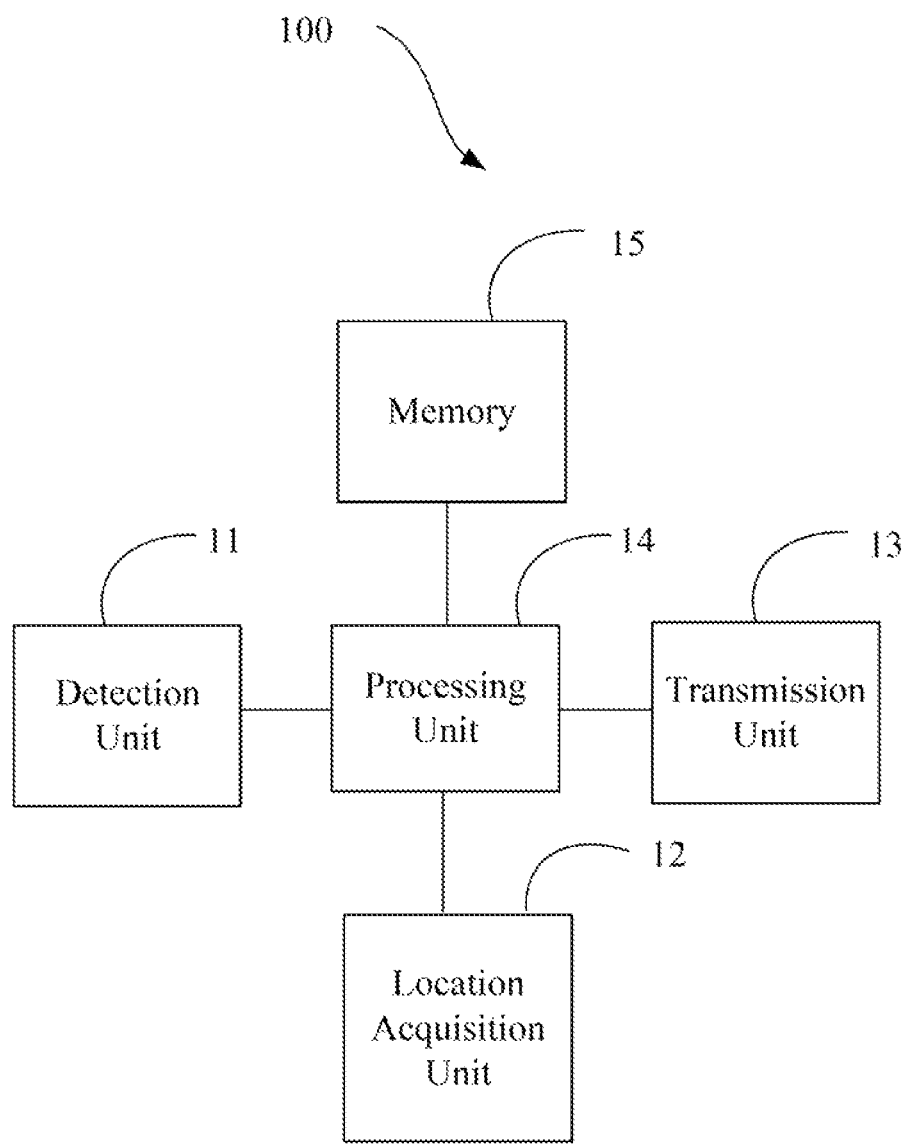
FIG. 1 is a schematic, block diagram of an electronic device, according to an exemplary embodiment.

Referring to FIG. 1, an electronic device 100, according to an embodiment, includes a detection unit 11, a location acquisition unit 12, a transmission unit 13, a processing unit 14, and a memory 15. The detection unit 11, the location acquisition unit 12, the transmission unit 13 and the memory 15 are electrically connected with the processing unit 14. In an embodiment, the electronic device 100 can be, but is not limited to, a mobile phone or in-car communication apparatus. The memory 15 can include a read only memory (ROM) and a random access memory (RAM) and stores programs and data for performing a series of operations of generating and transmitting an emergency message according to the present embodiment.

The detection unit 11 is configured for generating a start signal following a trigger operation, and sending the start signal to the processing unit 14. The detection unit 11 may be a touch screen, a key, or a controller which could be triggered by the use. The location acquisition unit 12 periodically acquires the location information of the electronic device 100 and submits the information to the memory 15. The location acquisition unit 12 may include a Global Positioning System (GPS) chip and/or an assisted-GPS (AGPS) chip.

The processing unit 14 executes the program stored in the memory 15 to generate the emergency message. The processing unit 14 acquires location information at the time of the trigger operation or the location information at the most recent time point if no location information at the time of the trigger operation exists in memory 15, and generates the emergency message based on the acquired location information in a preset format.

The processing unit 14 generates the emergency message by incorporating pre-edited text and the acquired location information. Pre-edited text can contain identification of the user and a request for assistance.

The transmission unit 13 transmits the emergency message to one or more pre-determined target addresses, such as phone numbers or email addresses.

Figure 2:
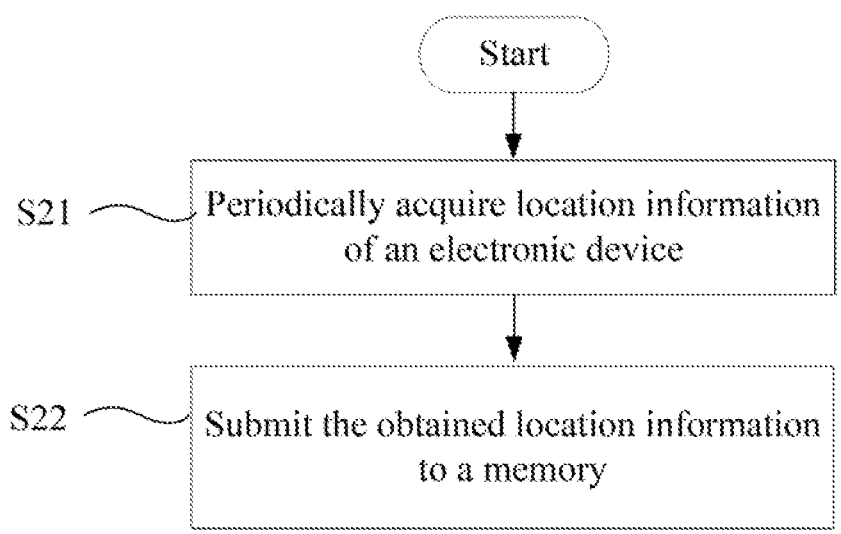
FIG. 2 is flowchart of a method for periodically acquiring the location of the electronic device of FIG. 1, according to one exemplary embodiment.

FIG. 2 is a flowchart of a method for periodically acquiring the location of the electronic device of FIG. 1, according to one exemplary embodiment. In step S21, the location acquisition unit 12 periodically acquires location information of the electronic device 100. In step S22, the location acquisition unit 12 stores the acquired location information in the memory 15.

Figure 3:
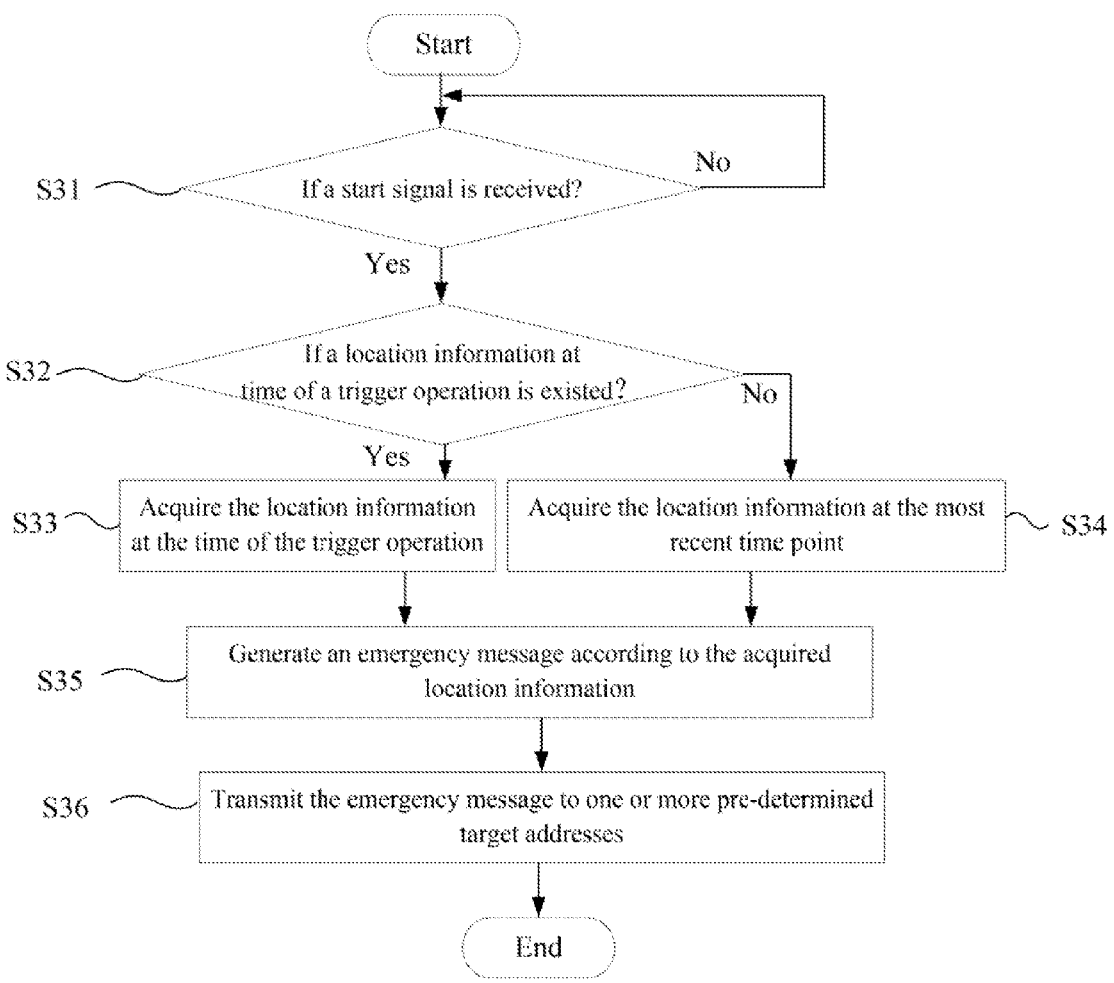
FIG. 3 is a flowchart of a method of transmitting an emergency message according to one exemplary embodiment.

FIG. 3 is a flowchart of a method implemented by the electronic device 100 according to one exemplary embodiment, to transmit an emergency message.

In step S31, the processing unit 14 determines if the start signal has been received, and if so, step S32 is implemented, and if not, step S31 is repeated. In step S32, the processing unit 14 determines if the location information of the electronic device 100 at the time of the trigger operation exists in the memory 15, and, if so, step S33 is implemented, and, if not, step S34 is implemented. In step S33, the processing unit 14 acquires the location information at the time of the trigger operation from the memory 15. In step S34, the processing unit 14 acquires the location information at the most recent time point from the memory 15. In step S35, the processing unit 15 generates an emergency message based on the acquired location information in the preset format. In step S36, the transmission unit 13 transmits the emergency message to the one or more pre-determined target addresses.

In another embodiment, the location acquisition unit 12 may periodically update the location information and only store the updated location information in the memory 15. In this way, the processing unit 14 needs not determine if the location information of the electronic device 100 at the time of the trigger operation exists in the memory 15. The processing unit 14 acquires the latest updated location information from the memory 15, and generates the emergency message based on the acquired updated location.

Accordingly, the processing unit 14 can transmit the most recent location information when no location information at the time of the trigger operation can be acquired.

It will be understood that particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An electronic device for generating and transmitting an emergency message, comprising:
a memory storing program for generating the emergency message and location information of the electronic device;
a detection unit to generate a start signal when sensing a trigger operation of a user;
a location acquisition unit to periodically acquire location information of the electronic device, and sending the location information each time acquired by the location acquisition unit to the memory;

a processing unit to execute the program stored in the memory to generate the emergency message based on the acquired location information, wherein, the processing unit acquires the location information stored the memory, the acquired location information is the location information which is sent by the location acquisition unit to the memory at the most recent time point and the processing unit generates the emergency message based on the acquired location information; and a transmission unit to transmit the generated emergency message to one or more pre-determined target addresses;

wherein the location acquisition unit is a Global Positioning System (GPS) chip or an assisted-GPS (AGPS) chip;

wherein the location acquisition unit is configured for periodically updating the location information which is acquired periodically and only storing the updated location information to the memory, and the processing unit is configured for acquiring the latest updated location information from the memory, and generating the emergency message according to the acquired updated location in a preset format.

2. The electronic device according to claim 1, wherein the detection unit is a touch screen, a touch sensitive key, or a controller which could be triggered by the user.

3. The electronic device according to claim 1, wherein the processing unit generates the emergency message by incorporating pre-edited text and the acquired location information.

4. A method for transmitting an emergency message by an electronic device, the method comprising:

generating a start signal when sensing a trigger operation of a user by a detection unit;

periodically acquiring the location information of the electronic device, and sending the location information each time acquired by the location acquisition unit to a memory by a location acquisition unit;

acquiring the location information stored the memory, wherein the acquired location information is the location information which is sent by the location acquisition unit to the memory at the most recent time point;

generating the emergency message based on the acquired location information; and transmitting the generated emergency message to one or more pre-determined target addresses by a transmission unit, wherein the location acquisition unit is a Global Positioning System (GPS) chip or an assisted-GPS (AGPS) chip;

wherein the method further comprises periodically updating the location information which is acquired periodically and only storing the updated location information to the memory; and further comprises generating the emergency message by incorporating pre-edited text and the acquired location information.

* * * * *